United States Patent

[11] 3,612,502

[72] Inventors Viktor Mikhailovich Vasiliev
ulitsa dzerzhinskogo, 3, kv. 60;
Robert Ashotovich Shiganov, ulitsa
Shurukhina, 26, kv. 75; Alexander Ilich
Remesnikov, prospekt Lenina, 179, kv.
114; Jury Nikolaevich Kosik, ulitsa
Gelendzhikskaya, 21, kv. 2; Nikolai
Borisovich Skorikov, prospekt Lenina, 179,
kv. 140; Alexandr Arkadievich Krikorian,
prospekt Lenina, 21, kv. 92, all of
Volgograd, U.S.S.R.
[21] Appl. No. 887,648
[22] Filed Dec. 23, 1969
[45] Patented Oct. 12, 1971

[54] APPARATUS FOR CUTTING HOLES IN
STRUCTURES AND DETAILS HAVING
CYLINDRICAL SURFACE
2 Claims, 1 Drawing Fig.
[52] U.S. Cl. .................................................. 266/23 M,
33/21 C, 266/23 N
[51] Int. Cl. .................................................. B23k 7/04

[50] Field of Search .......................................... 266/23 R,
23 N, 23 NW, 23 B, 23 E, 23 K, 23 M; 33/21 R, 21
B, 21 C; 77/77

[56] References Cited
UNITED STATES PATENTS
2,408,517  10/1946  Howard .......................... 33/21 C
2,567,414   9/1951  Walden .......................... 33/21 C
2,866,631  12/1958  Cink .............................. 266/23 N
2,910,289  10/1959  Grubish ......................... 33/21 C X
3,451,666   6/1969  Evans ............................ 266/23 E Primary Examiner—Frank T. Yost
Attorney—Waters, Roditi, Schwartz & Nissen ABSTRACT: An apparatus for cutting holes in structures and details having cylindrical surface with the aid of a cutter mounted with a possibility of simultaneous displacement in horizontal and vertical planes, in accordance with a mode set by a profiling device whose cams are placed on both sides of the cutter and are connected with the latter by means of a rod pivotally connected to the cutter and the cams, which rod, capable of tilting in a vertical plane, serves to maintain the cutter position at the level of a preset distance between the cutter and the surface of a structure in which a hole is being cut.

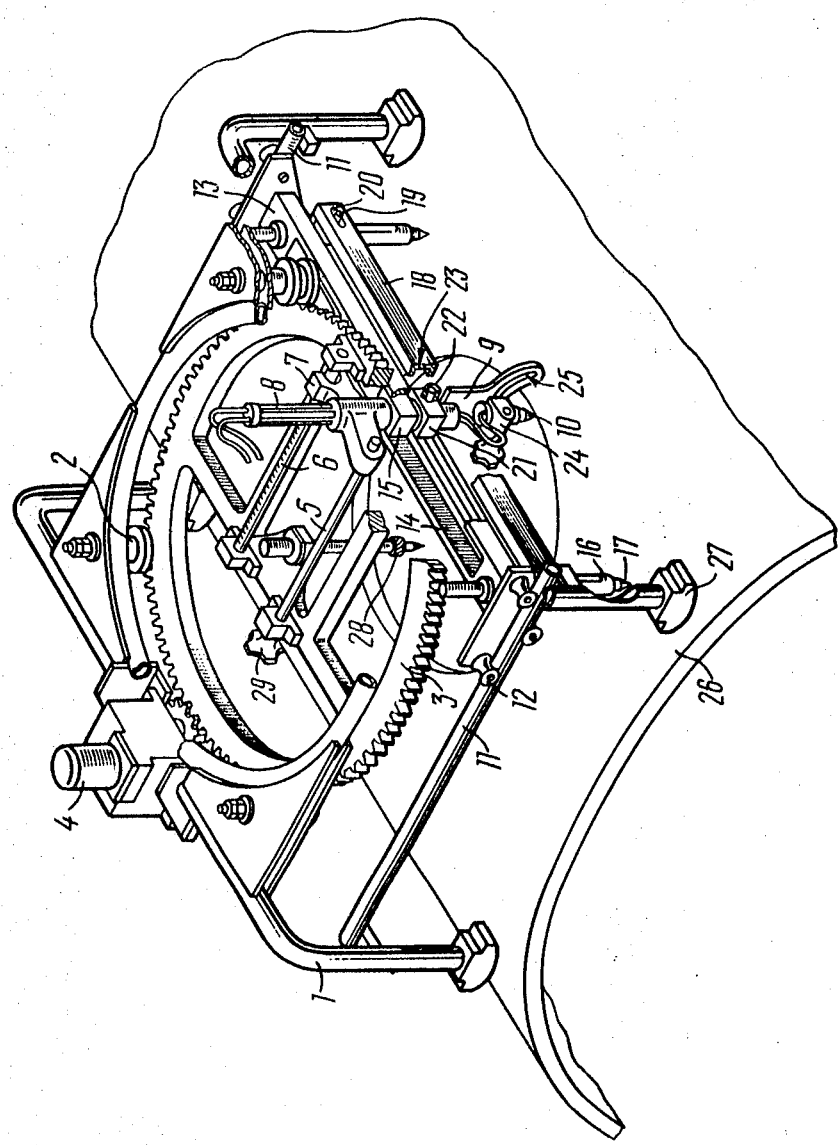

APPARATUS FOR CUTTING HOLES IN STRUCTURES AND DETAILS HAVING CYLINDRICAL SURFACE

The present invention relates to apparatus for cutting holes in structures and details having cylindrical surface, mainly boilers, tanks, heat exchangers etc.

There are widely known apparatus for cutting, with the aid of a cutter, round holes in the above-mentioned structures. In such apparatus a curvilinear closed-space trajectory of the cutter movement is ensured by the use of a sine or cam gear.

There are likewise known apparatus in which the cutter is fixed on a wheel with a possibility of vertical displacement by means of a special drive switched over for lifting or lowering depending upon the displacement of a profiling cam on the cylindrical surface of the structure.

The main disadvantage inherent in all the known apparatus consists in that they do not provide for a uniform distance between the cutter and the cylindrical surface of structures and details featuring ovality or conicity within permissible limits. Besides, these apparatus are to be rather accurately arranged with respect to the longitudinal axis of the cylindrical surface, for their tilting is liable to cause considerable variations of the distance from the cutter nozzle to the surface of structures and details. Nonuniformity of the distance between the cutter and surface being treated has a negative effect upon the quality of the cut, reduces the rate of cutting, causes additional operations on eliminating the defects of cutting.

It is an object of the present invention to eliminate the above-mentioned disadvantages of the known apparatus.

The main object of the present invention is to provide such interconnection between the cutter and profiling cams as to ensure a uniform distance between the cutter and cylindrical surface of a structure or detail under any conditions in the course of cutting.

In the accomplishment of said problem, in an apparatus for cutting holes in structures and details having cylindrical surface with the aid of a cutter mounted with a possibility of simultaneous displacement in horizontal and vertical planes in accordance with a mode set by a profiling device, according to the invention, profiling cams of said profiling device are placed on both sides of the cutter with a possibility of unobstructed vertical movement independent of each other in members serving to connect them with the cutter and, besides, the cutter and the cams are additionally connected by means of a rod to which each of the cams and the cutter are connected with the aid of pivot joints, the cutter pivot joint being mounted with a possibility of displacing along the rod.

The possibility of the cutter pivot movement along the rod is attained by the fact that the latter is provided with longitudinal grooves adapted to receive rollers fixed on the axle of the pivot connecting the cutter with the rod, whereas the pivot joints connecting the profiling cams to the rod are formed by oval slots in the rod and pins adapted to enter openings in the cams and the oval slots of the rod.

The present invention will be more apparent upon considering a detailed description of a specific embodiment thereof, reference being had to the accompanying drawing which shows an axonometric view of an apparatus for cutting holes in structures and details having cylindrical surface, according to the invention.

The apparatus incorporates a frame 1 with bearing rollers 2 in which a toothed wheel 3 rotates. The wheel 3 is rotated by means of a drive 4, likewise mounted on the frame 1. Mounted on the wheel 3 are guides 5 and 6 adapted for the displacement therealong of a carriage 7 carrying a bar 8 on which a cutter 10 is mounted with the aid of a bracket 9. The frame 1 is provided with guides 11 in which a cleat 13 moves on rollers 12. The cleat 13 is provided with a groove 14 in which moves a slide 15 rotatably mounted on the journal of the carriage 7 (the journal not shown in the drawing). Mounted in sleeves 16 on the cleat 13, with a possibility of unobstructed independent movement, are profiling cams 17.

The cutter 10 and the profiling cams 17 are pivotally interconnected by means of a rod 18.

The profiling cams 17 are connected to the rod 18 by means of pins 19 received in oval slots 20 of the rod 18.

A pivot joint 21 whereby the cutter 10 is connected to the rod 18 is capable of longitudinal displacement along the rod.

To this end, the axle of the pivot joint 21 mounts rollers 21 received by longitudinal grooves 23 of the rod 18.

For positioning the cutter 10 at an angle to the surface being treated, the bracket 9 is provided with an arrangement 24 adapted to be manually displaced in a shaped groove 25 of the bracket 9.

Both gas and plasma cutter can be employed for the purpose of cutting holes.

The apparatus can be placed on a balcony or portal for the purpose of cutting holes in large-size cylindrical articles.

The apparatus of the present invention operates in the following way.

The apparatus is fixed with the aid of magnets 27 on the cylindrical surface of a structure 26 so that an indicator 28 of the center of a hole to be cut coincide with the center of a hole marked on the cylindrical surface of the article. Thereupon, the indicator 28 is removed and placed on the frame 1 so as not to obstruct the movement of the cleat 13. The carriage 7 together with the bar 8 and the cutter 10 fixed on the latter is, in accordance to graduation indexes on the guide 6, set to a diameter somewhat smaller than the diameter of the hole to be cut.

The cutter 10 is set to operation, and a cut starting hole is flame drilled in the metal of the cylindrical structure 26. By turning a flywheel 29, the guide 5, together with the carriage 7 with the bar 8 and the cutter 10, is displaced to the value of the required diameter of the hole being cut. The drive 4 is switched on to rotate the wheel 3, whose rotation causes circumferential displacement of the carriage 7 and, with the aid of the slide 15, causes reciprocation of the cleat 13 in the guides 11 in a horizontal plane, transversely with respect to the cylindrical surface. The bar 8 with the cutter 10 moves circumferentially together with the carriage 7.

The movement of the cleat 13 causes vertical displacement (lifting or lowering) of the profiling cams 17, since the latter move on a curvilinear surface transversely with respect to the generatrices.

The vertical displacement of the profiling cams 17 causes, with the aid of the pins 19, the rod 18 and the pivot joint 21, vertical displacement of the bar 8 with the cutter 10, required in accordance with the angle of turn of the wheel 3. The wheel 3 with the cutter 10, upon making a complete revolution, is automatically stopped by limit switches (the limit switches not shown in the drawing), and the hole-cutting cycle terminates.

The distance from the cutter nozzle to the cylindrical surface of the article remains constant throughout the process of cutting, for the cutter and the profiling cams in their movement are always on the same common generating cylindrical surface.

If the cylindrical surface of the structure 26 features conicity or ovality, or the apparatus is positioned with insufficient accuracy, with a tilt relative the longitudinal axis of the cylindrical surface, one of the profiling cams 17 lifts or lowers with respect to the other cam, thereby causing the rod 18 to turn in a vertical plane.

The rod 18, turning in a vertical plane, adjusts the position of the cutter 10, actually maintaining the distance between the cutter and the cylindrical surface of the article at a present level.

For making chamfers on the hole cut edge, the cutter 10 together with the arrangement 24 is inclined along the shaped groove 25 of the bracket 9. Operations that follow are analogous with those performed when cutting a straight-edged hole.

After cutting the hole and making chamfers, the apparatus is removed from the article and mounted for cutting a subsequent hole.

We claim:

1. An apparatus for cutting holes in structures and details having cylindrical surface, comprising: a cutter mounted with a possibility of simultaneous displacement in horizontal and vertical planes; a profiling device adapted to set the mode of the vertical displacement of said cutter; profiling cams of said profiling device; members serving to connect said profiling cams with said cutter, in which members said profiling cams are mounted with a possibility of unobstructed vertical movement independent of each other; a rod serving to additionally couple said cutter and said profiling cams, both the cutter and the cams being connected to said rod by means of pivot joints, the pivot joint of said cutter being mounted with a possibility of displacement along said rod.

2. An apparatus according to claim 1, wherein said rod is provided with a longitudinal groove adapted to receive a roller fixed on the axle of said pivot joint serving to connect the cutter with said rod, while on the ends of the rod provision is made of oval slots adapted to receive pins of said profiling cams.